United States Patent

Sakaue et al.

[11] Patent Number: 6,025,586
[45] Date of Patent: Feb. 15, 2000

[54] IMAGE PROCESSING DEVICE, IMAGE RECORDING APPARATUS, AND IMAGE READING DEVICE AND IMAGE FORMING APPARATUS

[75] Inventors: Eiichi Sakaue; Gaku Takano, both of Yokohama; Yuuichi Akiyama, Tokyo, all of Japan

[73] Assignee: Kabushiki Kaisha Toshiba, Kawasaki, Japan

[21] Appl. No.: 09/115,634

[22] Filed: Jul. 15, 1998

[30] Foreign Application Priority Data

Jul. 15, 1997 [JP] Japan ................................. 9-189725

[51] Int. Cl.$^7$ ...................................................... H01J 40/14
[52] U.S. Cl. ........................................ 250/208.1; 348/263
[58] Field of Search .............................. 250/208.1, 559.3, 250/234, 235, 226; 348/263, 264, 265; 382/313, 318

[56] References Cited

U.S. PATENT DOCUMENTS 5,754,226  5/1998  Yamada et al. ........................ 348/219

FOREIGN PATENT DOCUMENTS

62-230163  10/1987  Japan .
5-80862   11/1993  Japan .

*Primary Examiner*—Que T. Le
*Attorney, Agent, or Firm*—Foley & Lardner

[57] ABSTRACT

According to the present invention, an image processing/converting section comprises a pixel position calculating section, a pulse width changing section, a pixel value shifting section, and a recording device driving pulse generating section. The pixel position calculating section generates main scanning direction coordinate information and sub-scanning direction coordinate information on the basis of parameters input into the pixel position calculating section resistor setting values xreg252 and yreg254, a main scanning direction clock signal, and a sub-scanning direction clock signal. The pixel value shifting section calculates an output value of the processed pixel after shifting operation on the basis of the main scanning direction coordinate information, the sub-scanning direction coordinate information, and the pulse width data which is obtained by converting input data of a pixel to be processed by the pulse width changing section. The recording device driving pulse generating section generates a recording device driving pulse on the basis of the reference position signal and the output value of the pixel to be processed.

9 Claims, 11 Drawing Sheets

PIXEL SUBJECTED TO TAKEF    PIXEL SUBJECTED TO GIVEB

FIG. 12A

PIXEL SUBJECTED TO TAKEF    PIXEL SUBJECTED TO GIVEB

FIG. 12B

PIXEL SUBJECTED TO GIVEF    PIXEL SUBJECTED TO TAKEB

FIG. 13A

PIXEL SUBJECTED TO GIVEF    PIXEL SUBJECTED TO TAKEB

FIG. 13B

TWO-PIXEL MODULATION
←FRONT REFERENCE POSITION
 (RIGHT REFERENCE POSITION)
→BACK REFERENCE POSITION
 (LEFT REFERENCE POSITION)

FIG. 14A

THREE-PIXEL MODULATION

FIG. 14B

| PIXEL NUMBER | | PIXEL SHIFTING VALUE CALCULATION |
|---|---|---|
| x%2 | 0 | THRU |
| | 1 | THRU |

FIG. 15A

| PIXEL NUMBER | | REFERENCE POSITION |
|---|---|---|
| x%2 | 0 | RIGHT |
| | 1 | LEFT |

FIG. 15B

| PIXEL NUMBER | | PIXEL SHIFTING VALUE CALCULATION |
|---|---|---|
| x%3 | 0 | THRU |
| | 1 | TAKEF |
| | 2 | GIVEB |

FIG. 16A

| PIXEL NUMBER | | REFERENCE POSITION |
|---|---|---|
| x%3 | 0 | RIGHT |
| | 1 | LEFT |
| | 2 | LEFT |
| | | |

FIG. 16B

TWO-PIXEL PERIOD

FIG. 17A

THREE-PIXEL PERIOD

FIG. 17B

PIXEL SHIFTING VALUE CALCULATION

|  |  | x%2 | |
|---|---|---|---|
|  |  | 0 | 1 |
| y%4 | 0 | THRU | THRU |
|  | 1 | GIVEF | TAKEB |
|  | 2 | THRU | THRU |
|  | 3 | TAKEB | GIVEF |

FIG. 18A

REFERENCE POSITION

|  |  | x%2 | |
|---|---|---|---|
|  |  | 0 | 1 |
| y%4 | 0 | RIGHT | LEFT |
|  | 1 | LEFT | LEFT |
|  | 2 | LEFT | RIGHT |
|  | 3 | LEFT | LEFT |

FIG. 18B

PIXEL SHIFTING VALUE CALCULATION

|  |  | y%3 | | | | | |
|---|---|---|---|---|---|---|---|
|  |  | 0 | 1 | 2 | 3 | 4 | 5 |
| x%3 | 0 | THRU | GIVEF | GIVEB | THRU | TAKEF | TAKEB |
|  | 1 | TAKEF | TAKEB | THRU | GIVEF | GIVEB | THRU |
|  | 2 | GIVEB | THRU | TAKEF | TAKEB | THRU | GIVEF |

FIG. 19A

REFERENCE POSITION

|  |  | y%3 | | | | | |
|---|---|---|---|---|---|---|---|
|  |  | 0 | 1 | 2 | 3 | 4 | 5 |
| x%3 | 0 | RIGHT | RIGHT | LEFT | LEFT | LEFT | LEFT |
|  | 1 | LEFT | RIGHT | RIGHT | RIGHT | LEFT | LEFT |
|  | 2 | LEFT | LEFT | LEFT | RIGHT | RIGHT | RIGHT |

TWO-PIXEL PERIOD

IMAGE PROCESSING DEVICE, IMAGE RECORDING APPARATUS, AND IMAGE READING DEVICE AND IMAGE FORMING APPARATUS

BACKGROUND OF THE INVENTION

This invention relates to an image processing device for processing an input image or image given as data in the most suitable manner, an image recording apparatus such as a multicolor copying machine which has the image processing device and forms a multicolor image by recording images of every color component with use of a plurality of photosensing drums and overlaying the read images, and an image forming apparatus.

Figure 20:
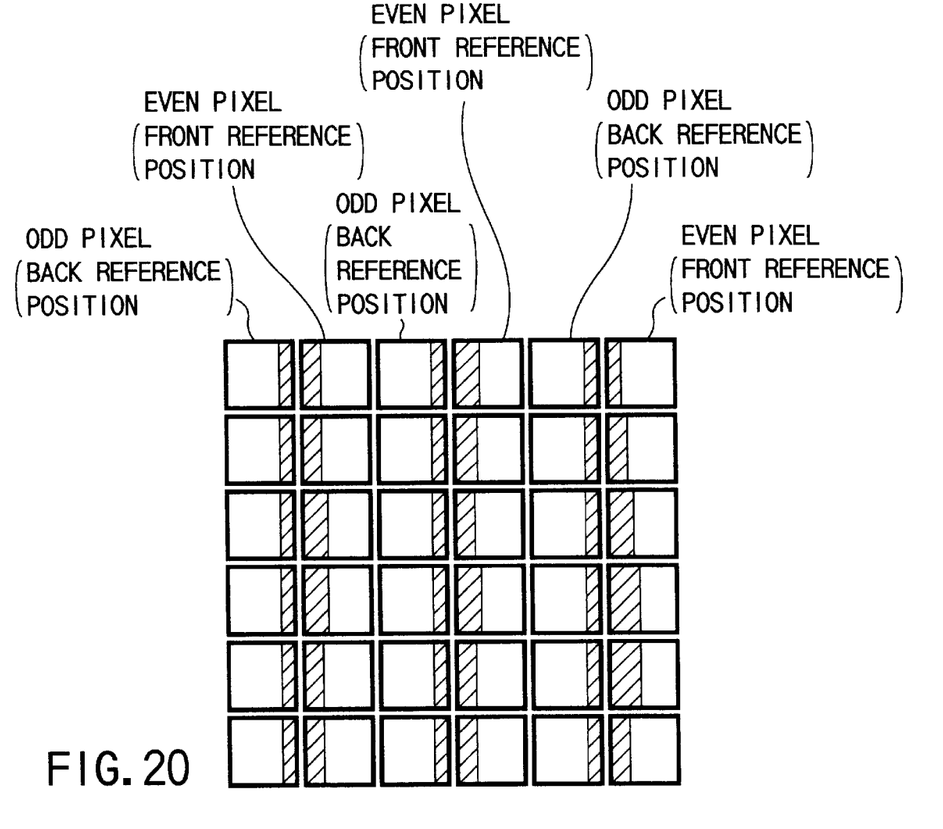
FIG. 20 is a view for explaining a line pattern recording method.

In the conventional printing field or in the industry of hard-copy machines such as a printer and a digital copying machine, a so-called line pattern image recording technique has been known. The line pattern image recording technique is a method of representing an image by a pattern constituted of a group of lines arranged in parallel periodically as shown in FIG. 20. Each of the lines is constituted of pixel values of a plurality of pixels arranged in a vertical direction, and the widths of the lines represent the gradation of the image.

According to the line pattern image recording technique, it is in the vertical direction that dots (pixels) are adjacent to each other in the vertical direction, thereby the frequency of the dot pattern is made so low that the density of the recorded image is made stable. Further, such a periodic texture is generally not recognized as noise, and thus a texture apparently having less noise can be obtained.

Figure 21:
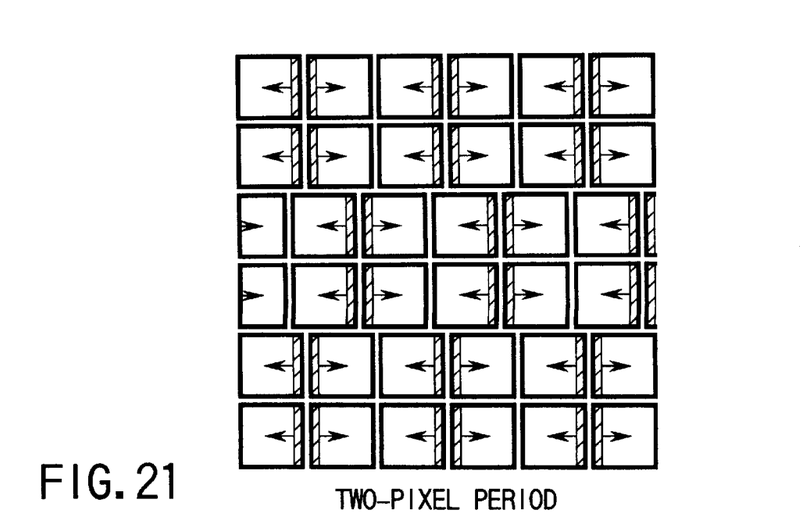
FIG. 21 is a view for explaining the conventional method of generating the line pattern having a two-pixel period.

According to method of recording the line pattern, with use of an image recording device driving pulse generation means capable of controlling the reference position (starting position) of a driving pulse for driving the image recording device in units of a pixel, the reference positions of the recording device driving pulse of even pixels and odd pixels are respectively defined as front reference positions and back reference positions to form a pattern as shown in FIG. 21, thereby a line pattern having a two-pixel period is obtained (Japanese Patent Publication No. 5-80862).

According to the above-mentioned conventional method however, only a line pattern having a two-pixel period can be obtained. In addition, the desirably inclined and smooth line pattern necessary in the multicolor recording cannot be formed according to this method.

BRIEF SUMMARY OF THE INVENTION

The object of the present invention is thus to provide an image processing device, an image recording apparatus, and an image forming apparatus, which can freely change the period and the angles of lines in units of an image or a part of an image in accordance with the characteristics of the image, such as color and structure.

According to the present invention, the above-mentioned object is attained by an image processing device comprising pixel position calculating means for calculating two-dimensional position of an input process pixel to be processed in an image; reference position signal generating means for generating a pulse reference position signal of the process pixel on the basis of the two-dimensional position of the process pixel calculated by the pixel position calculating means; pixel value shifting means for shifting a value of the pixel to be processed to a surrounding pixel next to the process pixel on the basis of the two-dimensional position of the process pixel calculated by the pixel position calculating means and a value of the surrounding pixel, in order to output an output value of the process pixel as a pixel value after the shifting operation; and recording device driving pulse generating means for outputting a recording device driving pulse on the basis of the output value of the process pixel, which is output from the pixel value shifting means, and the pulse reference position signal output from the reference position signal generating means.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the drawings.

Figure 1:
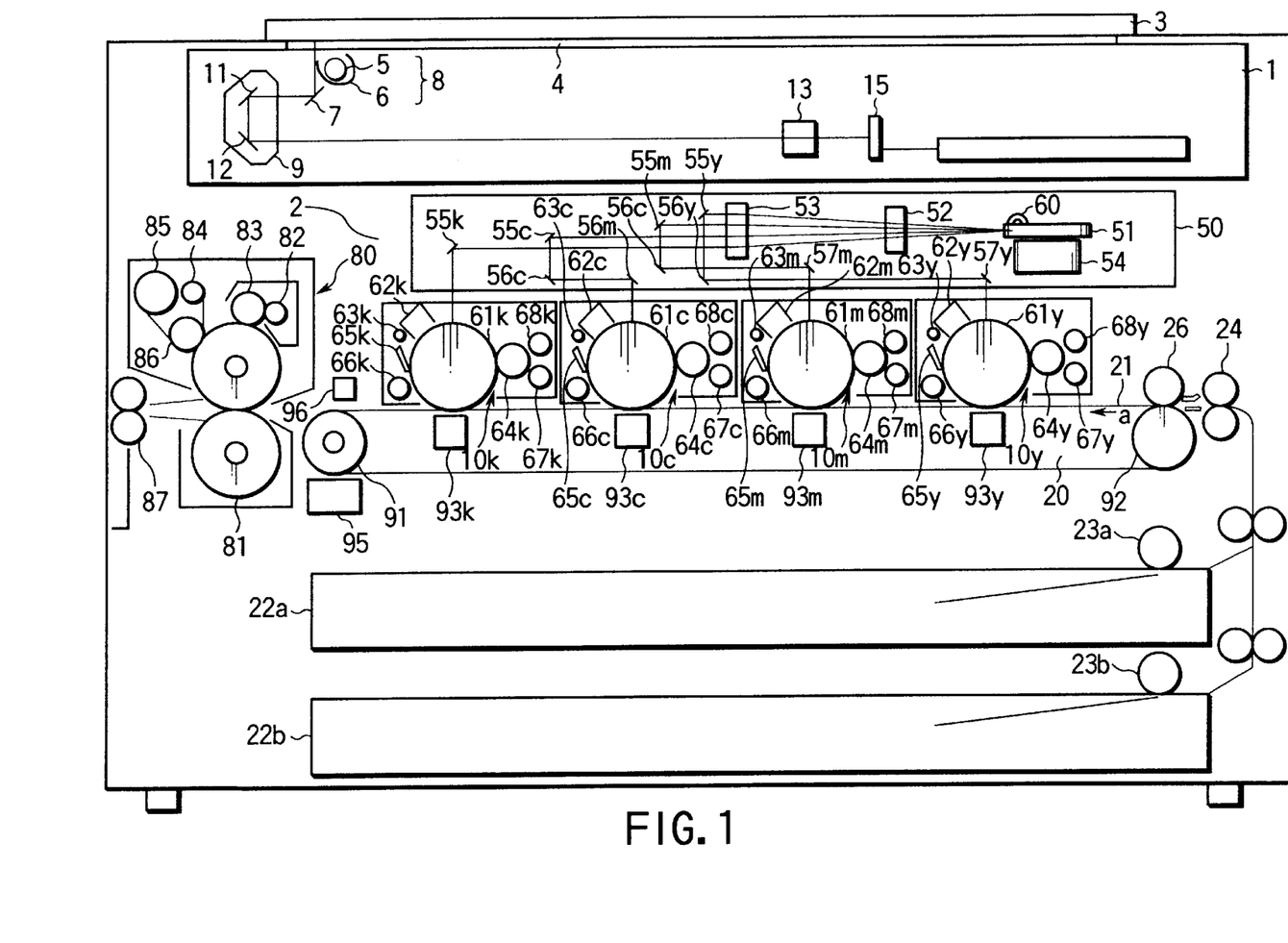
FIG. 1 is a sectional view of a digital multicolor copying machine according to the present invention.

FIG. 1 is a view showing an inner structure of a digital copying machine as one example of the present invention.

FIG. 1 is a sectional view showing an inner structure of a digital multicolor copying machine containing therein an image recording apparatus and an image processing apparatus according to the present invention. The digital multicolor copying machine has a scanner section 1 serving as image reading means and a printer section 2 serving as image forming means.

Figure 2:
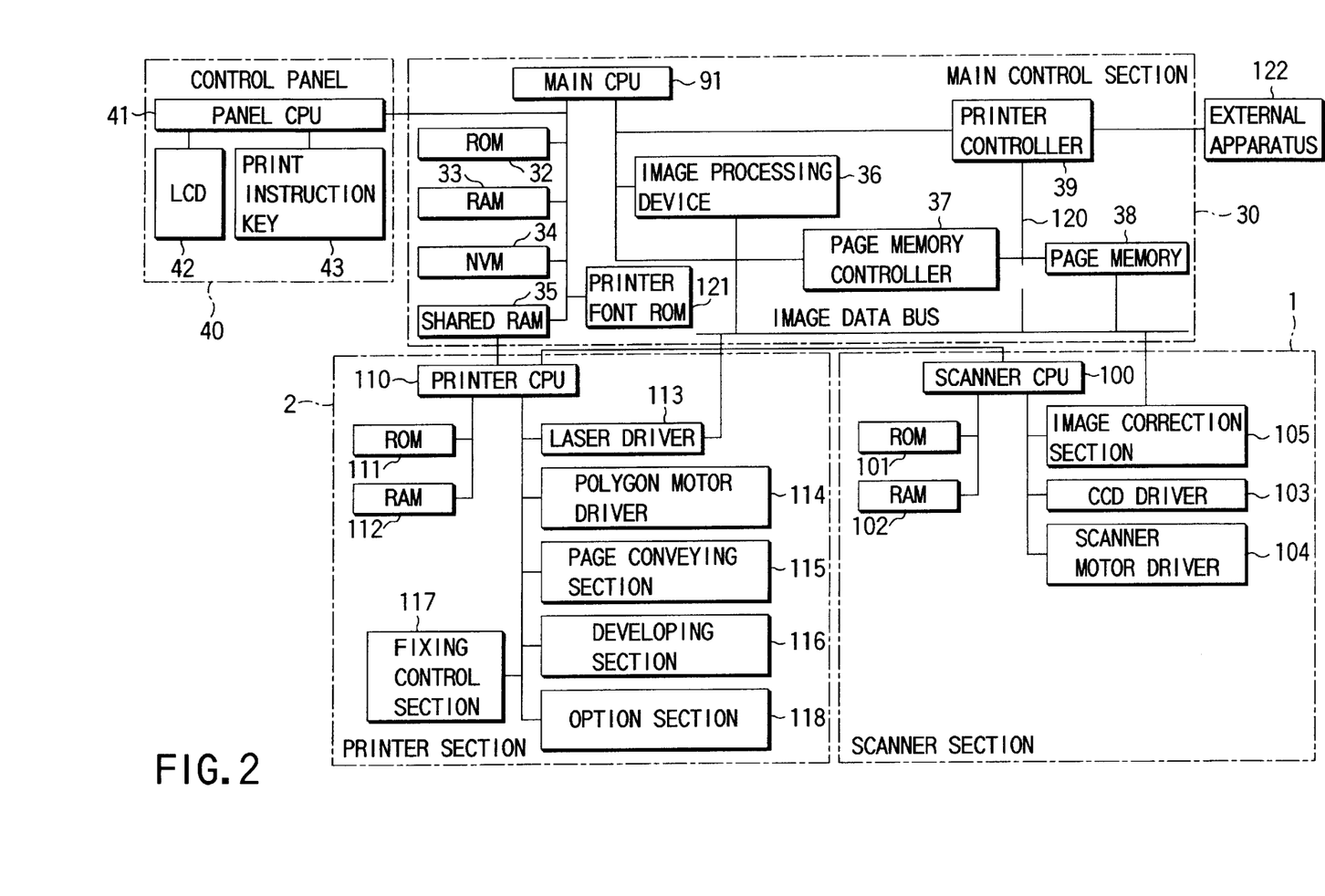
FIG. 2 is a block diagram showing the schematic constitution of the digital multicolor copying machine.

FIG. 2 is a block diagram schematically showing the electric connection in the digital multicolor copying machine shown in FIG. 1 and the flow of a control signal in the machine.

As shown in FIG. 2, the image processing device 36, the page memory 38, the printer controller 39, the image correction section 105, and the laser device driver 113 are connected to each other by an image data bus 120.

Figure 3A:
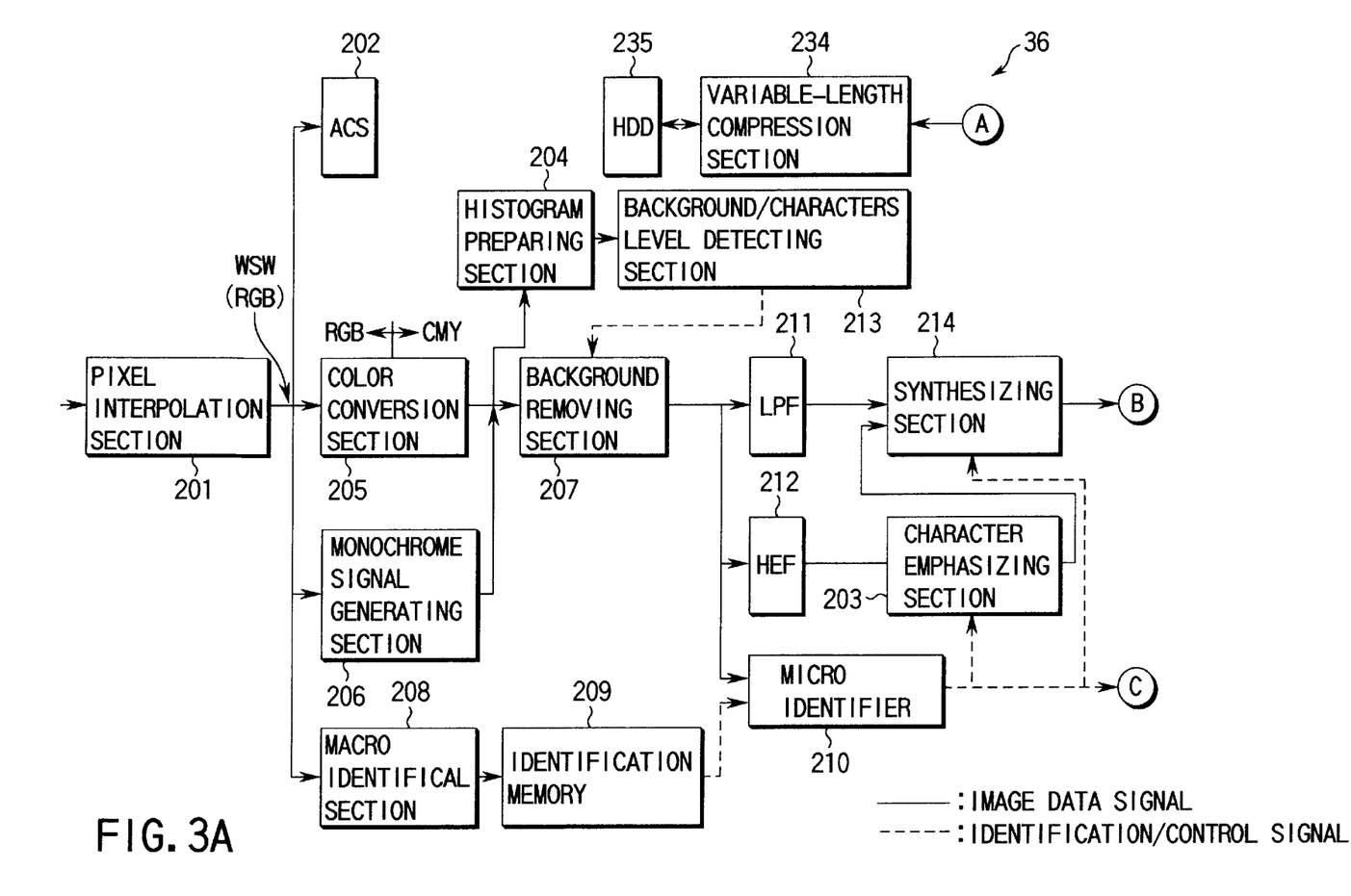
FIGS. 3A and 3B are a block diagram showing the schematic constitution of an image processing device according to the present invention.
Figure 3B:
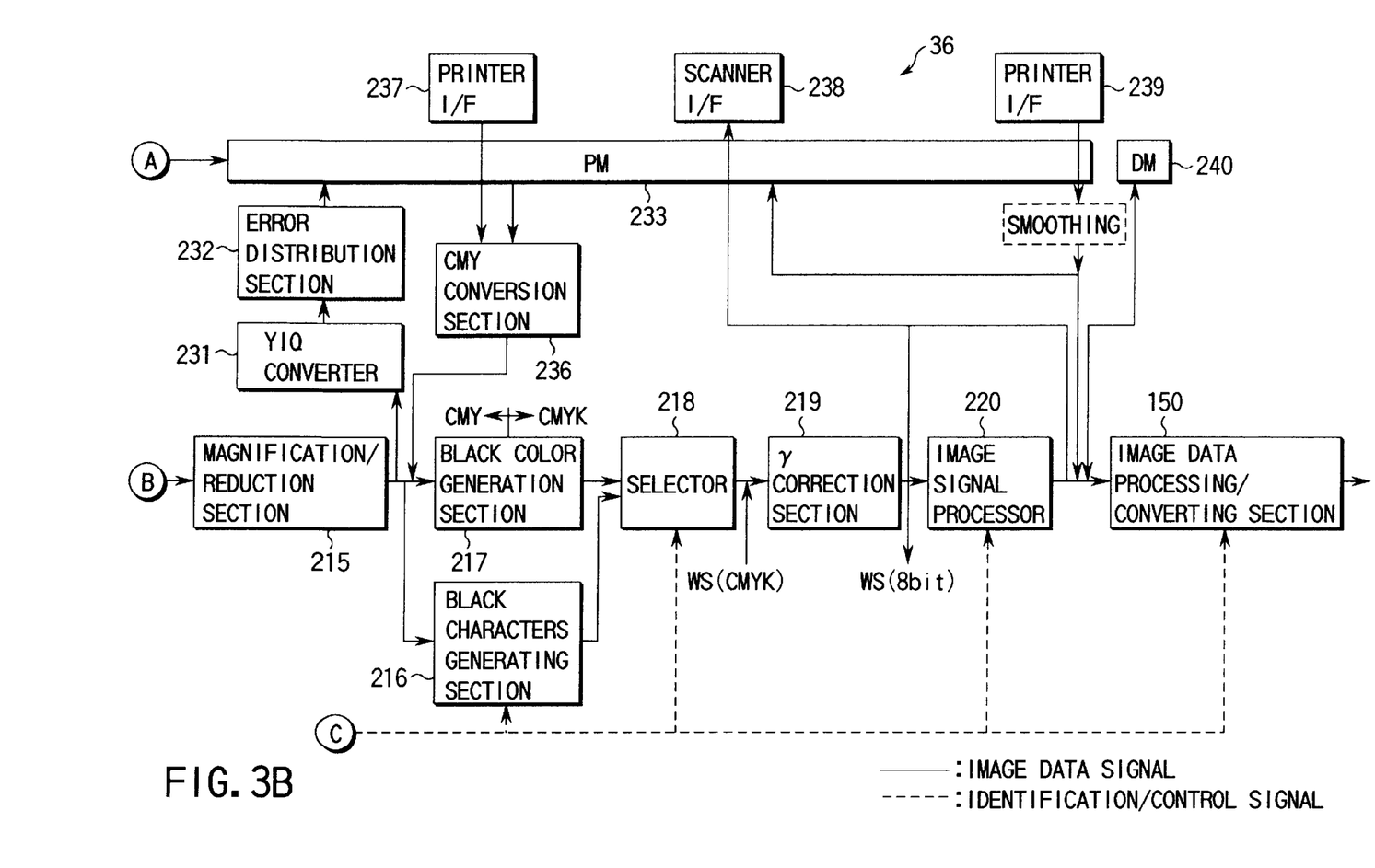

FIGS. 3A and 3B are a block diagram showing an example of the constitution of the image processing device 36 according to the present invention. The functions of sections shown in FIGS. 3A and 3B will be described below.

The magnification/reduction operation of the image read from an original document is generally performed as follows: the magnification/reduction of the image read in the main scanning direction is performed in a digital manner, and the magnification/reduction of the image read in the sub-scanning direction is performed by changing the moving speed of a scanner carriage. In an image processing device using a RGB three line CCD image sensor having a 8 line-pitch, no problem will occur when the magnification rate is not changed or is an integer. However, with the other magnification rate, misalignment will occur between the images of R (Red), G (Green), and B (Blue) in the sub-scanning direction. A pixel interpolation section 201 corrects the misalignment by interpolating pixel values of the images on the basis of the misalignment amount.

An ACS 202 determines whether the original document is monochrome one or multicolored. The ACS 202 performs the determination when the prescanning of the original document is performed. On the basis of the determination, the image processing device executes the multicolor processing or the monochrome processing in the normal scanning.

In the multicolor processing, scanner input signals output from the scanner are RGB image signals. On the other hand, while, printer signals to be processed in the printer section are CMYK image signals, and the color conversion needs to be performed. A color conversion section 205 converts the RGB image signals into the CMY image signals. The user can adjust the colors by changing parameters of the color conversion section 205. The K image signal is generated in a black color generating section 217.

A monochrome signal generating section 206 generates a monochrome signal from RGB image signals in a monochrome copying mode.

A background removing section 207, a histogram preparing section 204, and a background/character level detecting section 213 remove a background from a document having a background, such as a newspaper. In order to remove a background of an document, a color density histogram of a document is prepared at first by the histogram generating section 204, and the color density level of color pixels and the density level of characters are detected on the basis of the value of the histogram. On the basis of the detection levels, the background removing section 207 removes the background of the document, to attain clear dark characters output.

A macro identification section 208 discriminates a photo region and a character region: the macro identification section 208 prescans the document in order to roughly discriminate a photo region and a character region on the basis of the run image stored in the page memory 38. The discrimination result by the macro identification section 208 is temporarily stored in an identification memory 209, and output to a micro identification section 210 when the normal scanning is performed.

A micro identification section 210 discriminates the photo region and the character region in the document by referring a region of 3×3 pixels, for example. On the basis of the discrimination, processes in a character emphasizing section 203, a black character preparing section 216, a selector 218, a data processing section 220, and an image processing/converting section 150 are executed.

A low-pass filter (LPF) 211, a high-pass filter (HPF) 212, and the character emphasizing section 203 perform the space filtering such as the reducing of noise, moire patterns, or the like, and emphasizing an edge in the document or the emphasizing of characters. A synthesizing section 214 synthesizes the result of the above-mentioned processes to output the image signals to a magnification/reduction section 215.

The magnification/reduction section 215 magnifies/reduces the image in the main scanning direction.

In executing electronic sorting or the image rotation process, the image signal is temporarily stored in a page memory (PM) 233 at first, and processing sections read the region of the image which needs to be processed from the memory 233 in necessity to execute a necessary process. In such a process, the region of the image must be read at a predetermined rate. Accordingly, before the image signal is stored in the page memory 233, a fixed length compression/extension process is executed for the image signal in a YIQ converting section 231 and an error distribution section 232, at first.

The YIQ converting section 231 converts the CMY image signals into the YIQ signals to reduce the redundancy of the color components. The error distribution section 232 executes bit reduction by executing the error distribution without deteriorating the gradation. When the compressed image data is read from the page memory 233, the CMY conversion section 236 executes the extension of the image data and the conversion of the YIQ signals into the CMY image signals.

In executing an electronic sorting process requiring a memory capacity larger than that of the page memory 233, the image data is designed to be stored in a hard disk (HDD) 235. The accessing rate to the HDD 235 cannot be increased over a limit, and thus variable-length compression is executed in a variable-length compression section 234 in storing data to possibly increase the compression efficiency.

The black character preparing section 216 generates a K signal by overlaying the CMY signals. The quality of the black character, however, can be enhanced in color and resolution by using black color only than by overlaying the three primary colors. Accordingly, the selector 218 selects the output from the black color generating section 217 or the output from the black character preparing section 216 to output the selected signal to a γ correction section 219 on the basis of the identification signal output from the micro identification signal 210.

The γ correction section 219 corrects the γ characteristics of the printer. The γ characteristics correction is executed with reference to γ tables prepared for the CYK signals respectively.

The data processing section 220 executes processes for adjusting the gradation of the image, such as the error distribution. By virtue of this section, the conversion from an image signal of 8 bits into a signal of 4 bits or the like can be executed without deteriorating the gradation.

A direct memory (DM) 240 are used to respectively delay four color image signals such that the delays respectively correspond to the phases of the image signals, for example, in a four tandem type printer.

Further, when the different color image signals having the same line pattern are output from the four tandem type printer, moiré patterns or color error may occur due to the fine skews between the color images. In order to suppress the occurrence of the moiré patterns and the color error, the image processing/converting section 150 inclines screens for the color signals respectively, as will be described later in detail. Further, the characteristics of the signal level and the recording density of the image processed in the above-described sections are not linear ones. The image processing/converting section 150 controls the pulse generating time of a laser beam modulation section of the printer to adjust the pulse width such that the characteristics of the signal level and the recording density of the image are set as linear ones.

The image processing device 36 further comprises a printer interface (I/F) 237, a scanner interface (I/F) 238, and a printer interface (I/F) 239, which are used to connect the external apparatus and the image processing device.

Figures 4A, 4B:
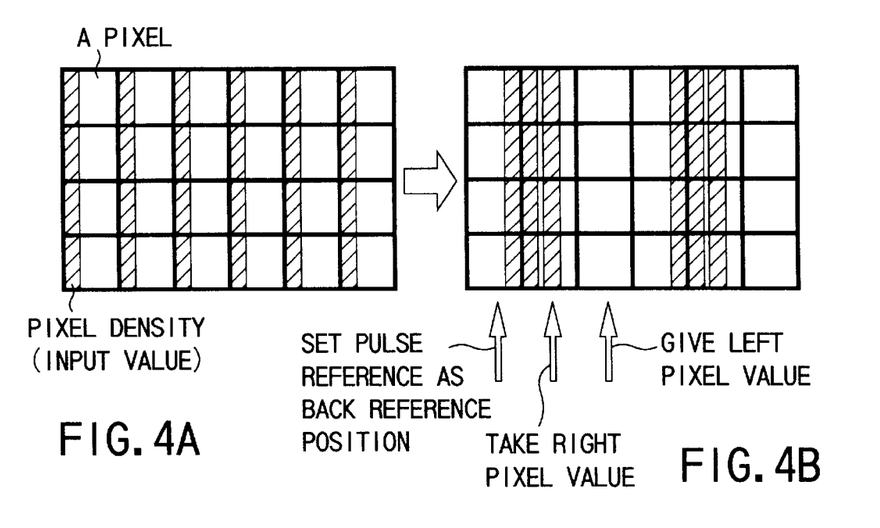
FIGS. 4A, 4B, and 4C are views schematically showing a recording device driving pulse in each pixel.
Figures 4C, 5:
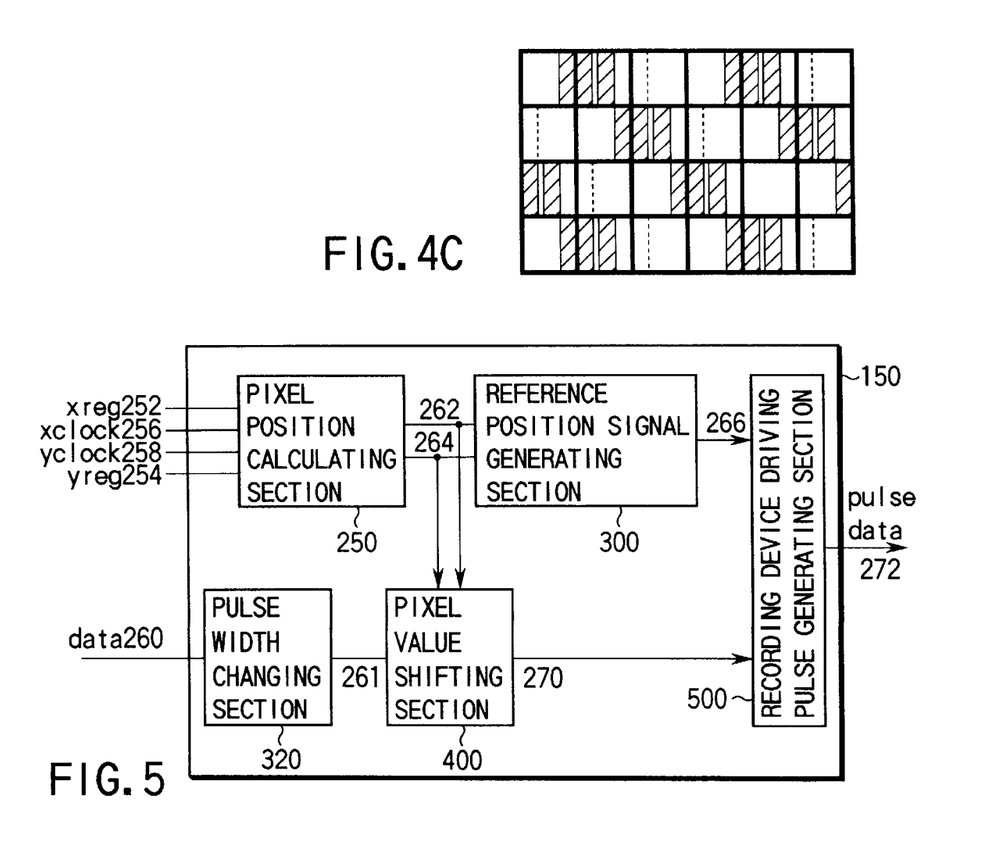
FIG. 5 is a block diagram showing the constitution of an image processing/converting section according to the present invention.

FIGS. 4A, 4B, and 4C schematically show a recording device driving pulses in each pixel.

FIG. 4A shows the case where the present invention is not applied, and neither of pulse reference position control and pixel value shifting are performed for each pixel. The width of the shaded rectangular regions in pixels shown in the drawing represents the length of a recording device driving pulse signal. Such a recording device driving pulse signal has a degree of free in selecting its reference position, in addition to that in its signal length: whether to drive a left end of the pixel or a right end of the pixel. However, a bitmap image read by a scanner as provided to the digital copying machine or a CG image input into a printer does not have such pulse reference position information, in general. Accordingly, it is the most general method to set all the pulse reference positions at the left end (i.e., set a left reference position), as shown in FIG. 4A.

FIG. 4B shows a vertical line pattern according to the embodiment of the present invention, which has a three-pixel period and a line pattern of which is not inclined in the vertical direction (sub-scanning direction). In order to prepare the texture shown in FIG. 4B from the texture shown in FIG. 4A, the pulse in the first column of the texture of FIG. 4A are set to be driven from the right end of the pixels (right reference position), and the pixel value in the second column are supplied with the pixel value of the third column on the right side thereof, as will be described later in detail. The pixel of the third column gave its own value to the second pixel in this manner, and is set to have no value. The line pattern of pixels after a fourth column are set in such a manner as described for the first to third columns.

FIG. 4C shows a three-pixel period line pattern as shown in FIG. 4B, a line pattern of which is inclined at 45°. The pixel value of the first row is set similarly to the texture of FIG. 4B. While, on the second row, the pixel value in the first column is set by the operation for the third column of FIG. 4B, and that of the second column is set by the operation for the first column. In short, the operation for each three-pixel period performed in FIG. 4B is performed also in FIG. 4C, but the operation phases of FIG. 4C are different from that of FIG. 4B such that the resultant line pattern has an angle of 45° with respect of a central axis of each column, as shown in FIG. 4C.

As is clear from these two drawings, the present invention forms an inclined line pattern by the operation of setting the pulse reference positions from which the pulses are driven, in regular (periodical) positions in pixels in accordance with two-dimensional information of the pixels of the image, and regularly (periodically) giving a pixel value to the pixel next to the pixel or taking the value of the adjacent pixel value (hereinafter, this operation is referred to as "shifting") in accordance with the two-dimensional information.

FIG. 5 is a block diagram showing the constitution of the image processing/converting section 150 of the image processing device 36 according to the present invention. The image processing/converting section 150 comprises a pixel position calculating section 250; a reference position signal generating section 300; a pulse width changing section 320; a pixel value shifting section 400; and a recording device driving pulse generating section 500.

The pixel position calculating section 250 serving as pixel position calculating means receives resistor setting values xreg252 and yreg 254, a main scanning direction clock signal xclock256, a sub-scanning direction clock signal yclock258, thereby generates main scanning direction coordinate information x262 and sub-scanning direction coordinate information y264.

The reference position signal generating section 300 serving as reference position signal generating means generates a pixel reference position signal 266 on the basis of the main scanning direction coordinate information x262 and the sub-scanning direction coordinate information y264.

The pulse width changing section 320 serving as pulse width changing means calculates pulse width data 261 from input data 260. The calculation is performed to set the relationship between the signal level and the image recording density to be desired one such as linear or exponential.

The pixel value shifting section 400 serving as pixel value shifting means calculates an output value 270 of the processed pixel after shifting on the basis of the main scanning direction coordinate information x262, the sub-scanning direction coordinate information y264, and the pulse width data 261. The shifting operation is performed after the pulse width changing section 320 converts the input data 260 into the pulse width data 261 in which the image recording density has linear characteristics, and thus the recording density having the linear characteristics is kept even after the shifting.

The recording device driving pulse generating section 500 serving as recording device driving pulse generating means generates a recording device driving pulse 272 on the basis of the reference position signal 266 and the output value 270 of the processed pixel. The recording device driving pulse 272 is the signal for driving the recording device while the pulse is being output, such as a laser device driving signal in an electric photograph recording device using a laser beam.

Figure 6A:
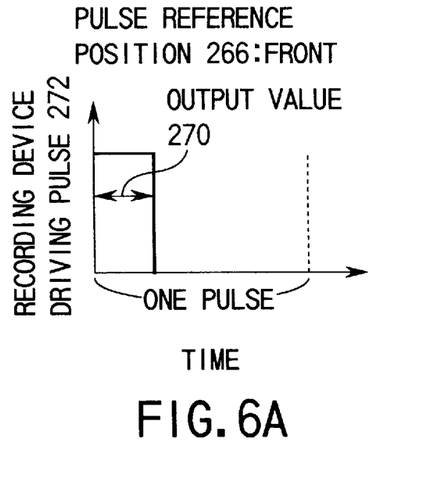
FIGS. 6A and 6B are graphs showing the relationship between a reference position signal, a processed pixel output value, and the recording device driving pulse.
Figure 6B:
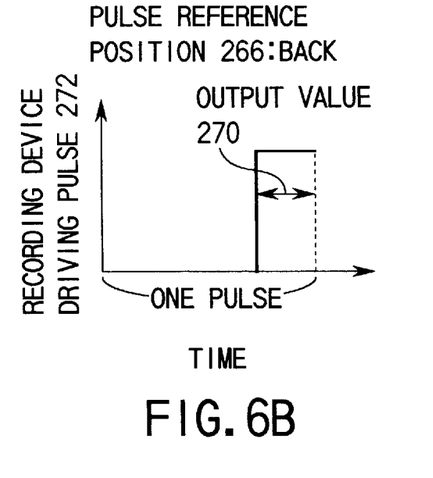

FIGS. 6A and 6B are graphs showing the relationship between the pixel reference position signal 266, the processed pixel output value 270, and the recording device driving pulse 272 in the recording device driving pulse generating section 500. FIG. 6A shows the processed pixel output value 270 when the pixel reference position signal 266 sets the reference position at the right end, and FIG. 6B shows the processed pixel output value 270 when the pixel reference position signal 266 sets the reference position at the left end.

Figure 7:
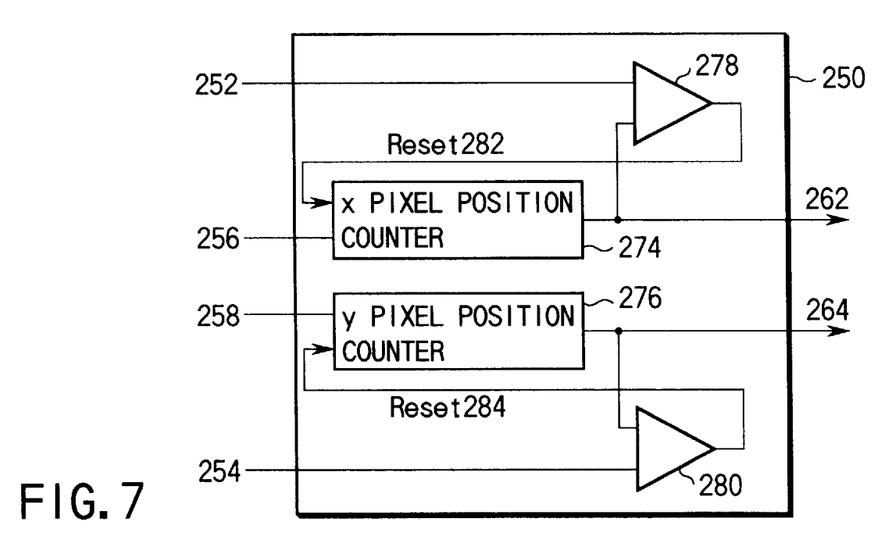
FIG. 7 is a block diagram showing the constitution of a pixel position calculating section.

FIG. 7 is a block diagram showing the constitution of a pixel position calculating section 250. The pixel position calculating section 250 comprises an X pixel position counter 274; a Y pixel position counter 276; and comparators 278 and 280.

The X pixel position counter 274 is a synchronous reset counter which counts up upon receiving a clock signal xclock 256 and outputs the value at the time as the main scanning direction coordinate x262. When the comparator 278 determines that the register setting signal xreg252 corresponds to the main scanning direction coordinate x262, a reset signal 282 is generated to reset the count-up value. In other words, the X pixel position counter 274 counts the value from 0 upto the register setting value xreg252.

Figure 8:
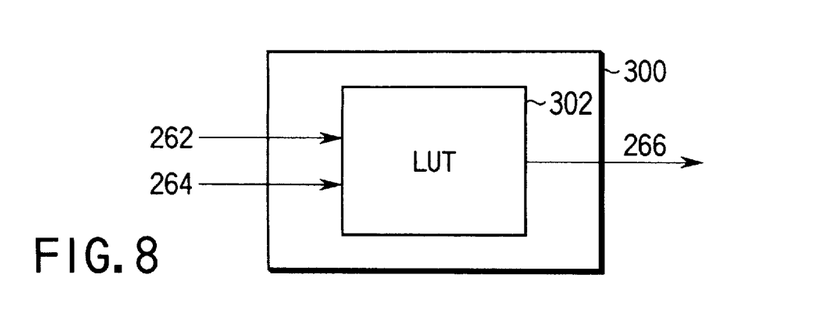
FIG. 8 is a view showing the constitution of a pixel reference position signal generator.

FIG. 8 shows the constitution of the reference position signal generating section 300. The reference position signal generating section 300 comprises a look-up table LUT302. When the main scanning direction coordinate information x262 and the sub-scanning direction coordinate information y264 are input into the look-up table LUT302, the reference position signal generating section 300 generates the reference position signal 266 corresponding thereto.

Figure 9:
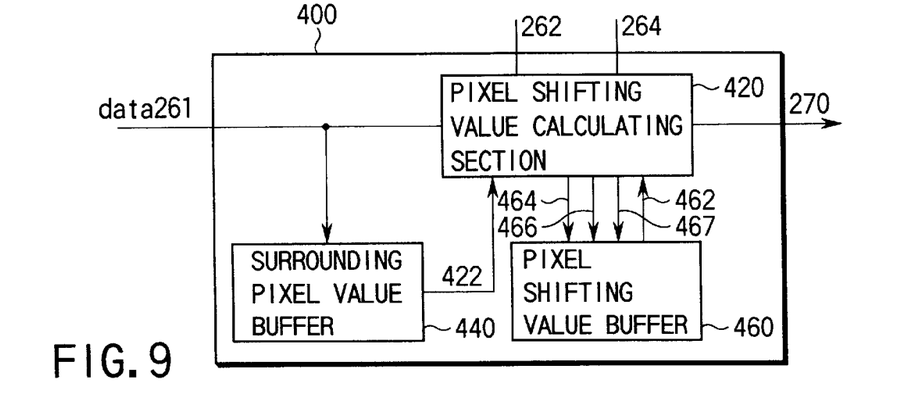
FIG. 9 is a view showing the constitution of a pixel value shifting section.

FIG. 9 shows the constitution of the pixel value shifting section 400. The pixel value shifting section 400 comprises a pixel shifting value calculating section 420; a surrounding pixel value buffer 440; and a pixel shifting value buffer 460.

The pulse width data 261 is sent to both the pixel shifting value calculating section 420 and the surrounding pixel value buffer 440, simultaneously. The surrounding pixel value buffer 440 temporarily stores the pulse width data 261, and then outputs it as surrounding pixel data 422. The pixel shifting value calculating section 420 reads the surrounding pixel data 422, the pulse width data 261, and a read pixel shifting value 462 which corresponds to the processed pixel stored in the pixel shifting value buffer 460, and determines the output value 270 and a write pixel value 467 to output them. The pixel shifting value calculating section 420 outputs a memory address 464 and a read/write control signal 466 from the pixel shifting value buffer 460 in order to read/write data.

Figure 10:
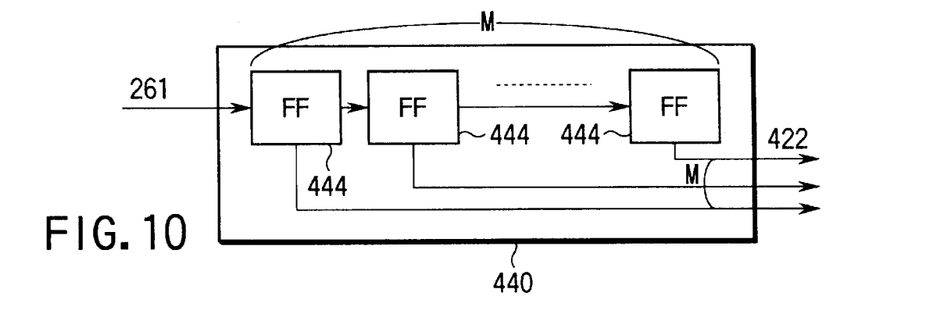
FIG. 10 is a view showing the constitution of a surrounding pixel value buffer.

FIG. 10 shows the constitution of the surrounding pixel value buffer 440. The surrounding pixel value buffer 440 buffers the processed pixels transferred thereto in succession in M flip-flops 444 contained therein, and outputs the value buffered in each flip-flop as the surrounding pixel data 422.

Figure 11:
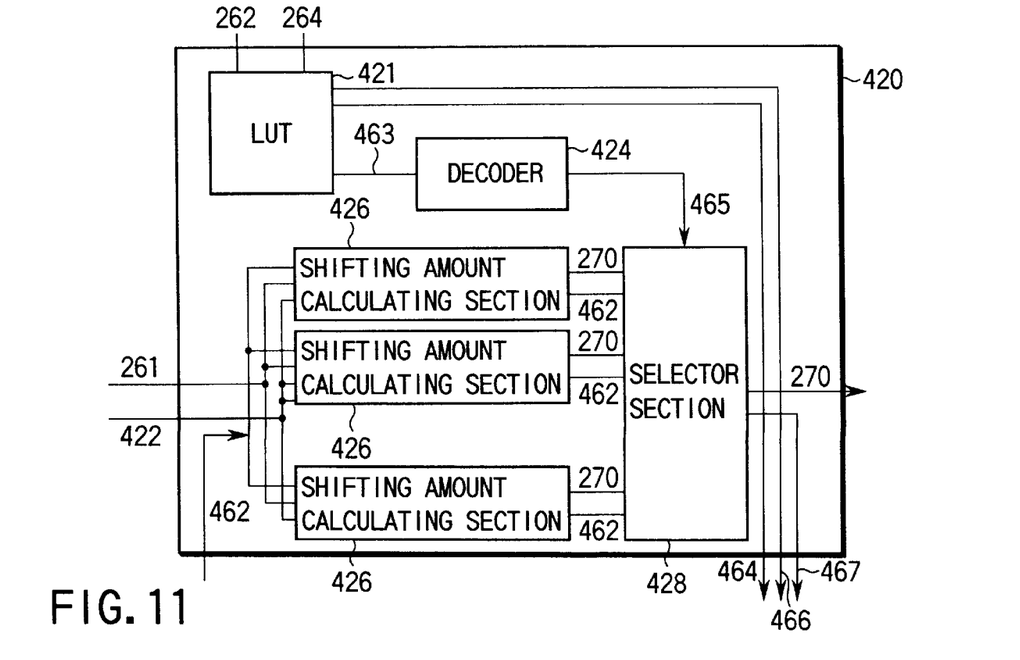
FIG. 11 is a view showing the constitution of a pixel shifting value calculating section.

FIG. 11 shows the constitution of the pixel shifting value calculating section 420. The pixel shifting value calculating section 420 comprises a look-up table LUT412; a decoder 424; a plurality of shifting amount calculating sections 426; and a selector section 428.

When the main scanning direction coordinate information x262 and the sub-scanning direction coordinate information y264 are input into the look-up table LUT412, an original shifting amount calculating selector signal 463, a memory address 464 of the shifting amount buffer 460, and a read/write control signal 466 are generated.

The decoder 424 decodes the original shifting amount calculating selector signal 463 to output a shifting amount calculating selector signal 465 to the selector section 428.

The shifting amount calculating sections 426 each obtain the output value 270 of the processed pixel and the pixel shifting value 462 on the basis of the surrounding pixel value 422, the pulse width data (pixel value) 261, the read pixel shifting amount value 462 corresponding to the processed pixel stored in the pixel shifting value buffer 460, and outputs them to the selector section 428. The selector section 428 selects one of the output values 270 after the shifting operation in accordance with the shifting amount calculating selector signal 465 output from the decoder 424, and outputs it. Simultaneously, the selector section 428 outputs the write pixel value 467 to the pixel shifting value buffer 460.

In order to obtain the output value 270 and the pixel shifting amount value 462, the shifting amount calculating sections 426 executes the following operations (calculation), for example:

1) THRU;
2) TAKEF;
3) GIVEB;
4) GIVEF; and
5) TAKEB.

The operation THRU is the operation of directly outputting the pulse width data (pixel value) 261, as the output value 270.

Figure 12A:
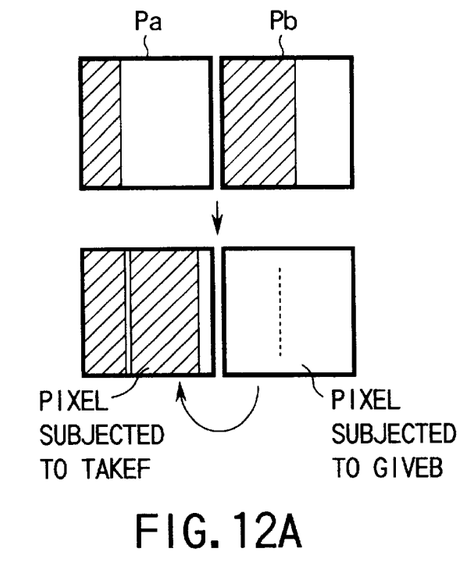
FIGS. 12A and 12B are views for explaining pixels subjected to the operation by a pixel shifting value calculating section.
Figure 12B:
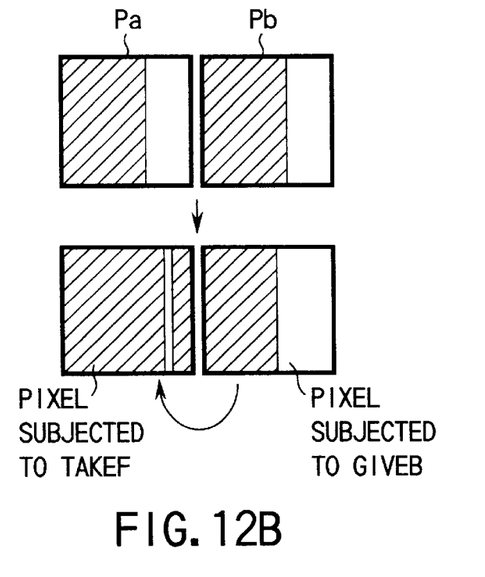

The operation TAKEF will be described below with reference to FIGS. 12A and 12B. In FIGS. 12A and 12B, the pixel to be processed denotes "Pa" and the right "Pb" next to Pa on the right side.

The operation TAKEF is shifting calculation in which the value of Pb is added to that of Pa. When the total sum of Pa+Pb does not exceed the density 100%, the output value 270 the processed pixel after the shifting operation is set to be equal to the total sum of Pa and Pb as shown in FIG. 12A. Then, the pixel shifting amount 0% is written into the pixel shifting amount buffer 460 to correspond to the value of the right pixel Pb.

While, when the total sum of Pa+Pb exceeds the density 100% as shown in FIG. 12B, the output value 270 of the processed pixel after the shifting operation is set as 100%. Then, the pixel shifting amount Pa+Pb−100% is written as the write pixel shifting amount 467 into the pixel shifting amount buffer 460.

Next, the operation GIVEB will be described below in a similar manner with reference to FIGS. 12A and 12B. The operation GIVEB is executed for the right pixel next to the pixel subjected to the operation TAKEF, to add its own pixel value to the left pixel adjacent thereto. The pixel to be processed is denoted as "Pb" and the left pixel next to the pixel to be processed is denoted as "Pa".

As shown in FIG. 12A, when the total sum of Pa +Pb does not exceed the density 100%, the output value after the shifting operation is 0%, and when the total sum of Pa+Pb exceeds the density 100% as shown in FIG. 12B, the output value after the shifting operation is Pa+Pb−100%. Those values have been already written in regions of the pixel shifting amount buffer 460, which corresponds to the processed pixel when the operation TAKEF was executed, in fact. The practical operation thus can be completed merely by reading those values from the pixel shifting amount buffer 460 as the pixel shifting amount 462.

Figure 13A:
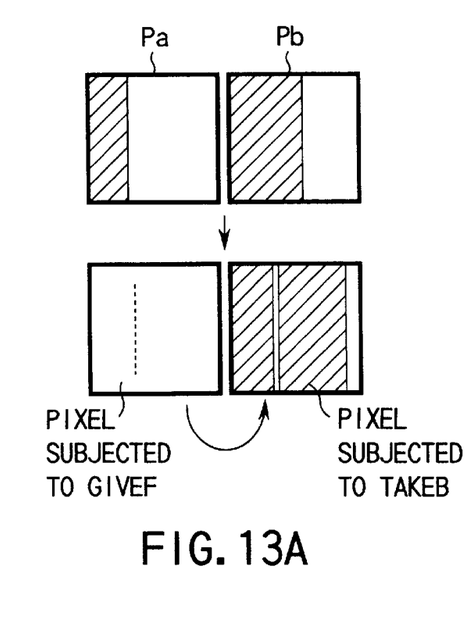
FIGS. 13A and 13B are views for explaining pixels subjected to the calculation by a pixel shifting value calculating section.
Figure 13B:
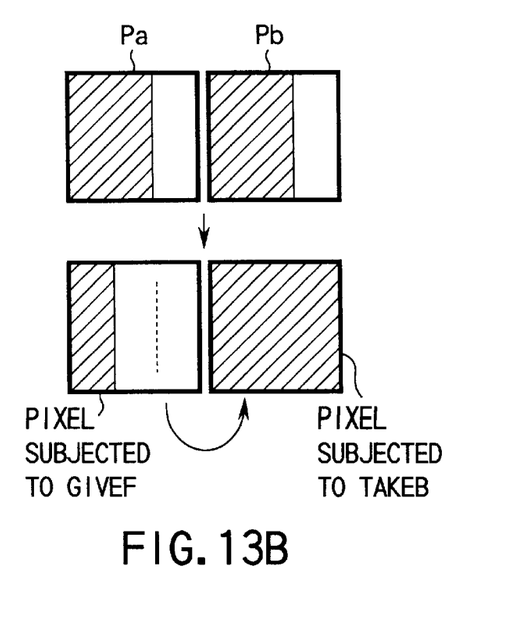

The operation GIVEF will be also described below with reference to FIGS. 13A and 13B. In FIGS. 13A and 13B, the pixel to be processed denotes "Pa" and the right "Pb" next to Pa on the right side.

The operation GIVEF is the shifting calculation in which the value of Pb is added to that of Pa. When the total sum of Pa+Pb does not exceed the density 100%, the output value 270 is set as 0%, as shown in FIG. 13A. Then, the amount Pa is written as the write pixel shifting amount 467 into the pixel shifting amount buffer 460.

While, when the total sum of Pa+Pb exceeds the density 100% as shown in FIG. 13B, the output value 270 of the processed pixel after the shifting operation is set as Pa+Pb−100%. Then, the pixel shifting amount 100%−Pb is written into a region of the pixel shifting amount buffer 460, which corresponds to the right pixel Pb.

Next, the operation TAKEB will be described below in a similar manner with reference to FIGS. 13A and 13B. The operation TAKEB is executed for the right pixel next to the pixel subjected to the operation GIVEF to add the value of the left pixel adjacent thereto to its own pixel value. The pixel to be processed is denoted as "Pb" and the left pixel next to the pixel to be processed is denoted as "Pa".

As shown in FIG. 13A, when the total sum of Pa+Pb does not exceed the density 100%, the output value after the shifting operation is Pa+Pb, and when the total sum of Pa+Pb exceeds the density 100% as shown in FIG. 13B, the output value after the shifting operation is 100%. Those values have been already written into a region of the pixel shifting amount buffer 460 which corresponds to the processed pixel when the operation GIVEF was executed, in fact. The practical operation thus can be completed merely by reading those values as the pixel shifting amount 462, and adding it to Pb.

Figure 14A:
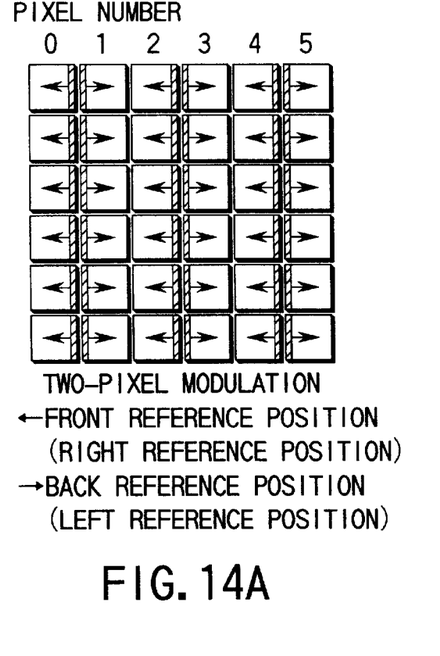
FIG. 14A is a view for explaining a line pattern having a two-pixel period.
Figure 14B:
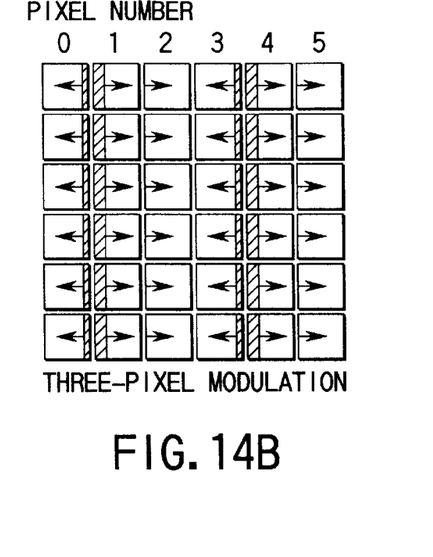
FIG. 14B is a view for explaining a line pattern having a three-pixel period.

FIG. 14A shows a non-inclined line pattern having a two-pixel period (two-pixel modulation), and FIG. 14B shows a non-inclined line pattern having a three-pixel period (three-pixel modulation).

Figure 15A:
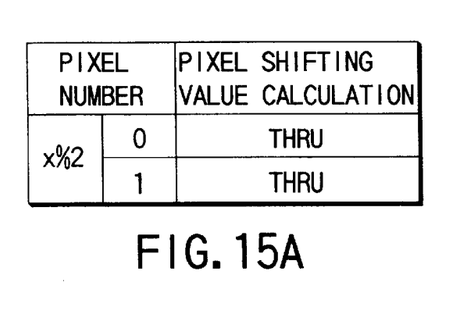
FIG. 15A is a table representing the relationship between the two-dimensional position (x, y) of the processed pixel and the pixel shifting value calculation.
Figure 15B:
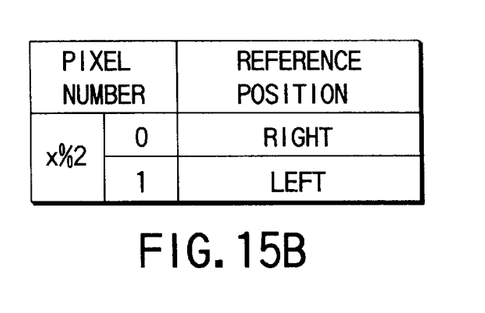
FIG. 15B is a table representing the relationship between the two-dimensional position (x, y) of the processed pixel and a reference position.

FIGS. 15A and 15B are tables showing the relationship between the two-dimensional position (coordinates x and y) of the processed pixel and the pixel shifting value calculation for forming the line pattern having a two-pixel period shown in FIG. 14A. FIG. 15A shows the relationship between the two-dimensional position of the processed pixel, i.e., the main scanning direction coordinate information x262 and the sub-scanning direction coordinate information y264, and types of the pixel shifting value calculations. FIG. 15B shows the relationship between the two-dimensional position of the processed pixel, i.e., the main scanning direction coordinate information x262 and the sub-scanning direction coordinate information y264, and the reference position signal 266.

In the tables, "x%2" represents the reminder when the main scanning direction coordinate information x262 of the processed pixel is divided by 2.

When x%2=0, the main scanning direction coordinate information x262 is even, and when x%2=1, the main scanning direction coordinate information x262 is odd.

Figure 16A:
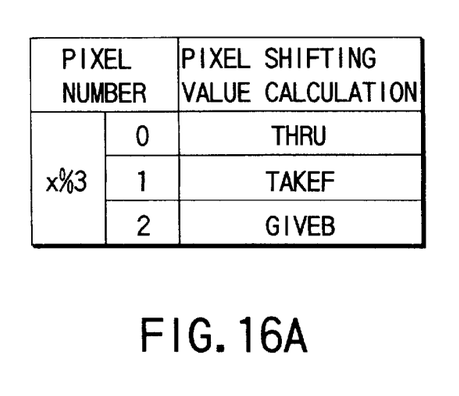
FIG. 16A is a table representing the relationship between the two-dimensional position of the processed pixel and the pixel shifting value calculation.
Figure 16B:
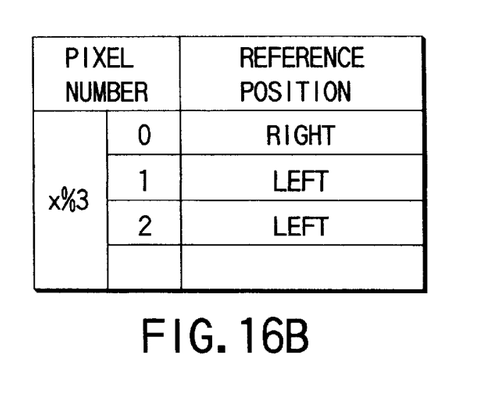
FIG. 16B is a table representing the relationship between the two-dimensional position of the processed pixel and a reference position.

FIGS. 16A and 16B show the relationship between the two-dimensional position of the processed pixel, types of the pixel shifting value calculations, and the reference position, for generating the line pattern with three-pixel period shown in FIG. 14B. FIG. 16A shows the relationship between the two-dimensional position of the processed pixel and types of the pixel shifting value calculations, and FIG. 16B shows the relationship between the two-dimensional position of the processed pixel and a reference position. By executing the operations presented in the table of FIG. 16A, three-pixel modulation can be attained. Such three-pixel modulation cannot be attained by the conventional technique of attaining the line pattern by switching the front pixel reference position (left reference position) and the back pixel reference position (right reference position).

To be more specific, the main CPU 91 makes the look-up table LUT302 rewritable to rewrite the contents of the look-up table LUT302 from that shown in FIGS. 15A and 15B to that shown in FIGS. 16A and 16B. In this manner, the switching from the two-pixel modulation to the three-pixel modulation can be attained. This switching cannot be attained by the conventional technique. To switch the modulations, the image processing device may be provided with two look-up tables LUT302 shown in FIGS. 15 and 16 such that the main CPU 91 can desirably switch them.

Figure 17A:
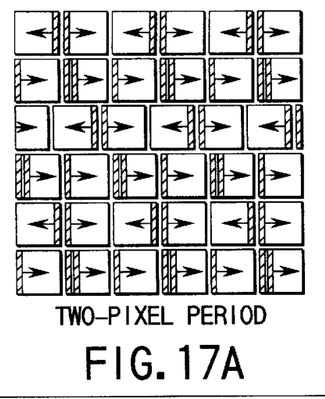
FIG. 17A shows a line pattern which has a two-pixel period and is inclined at 63 degrees.
Figure 17B:
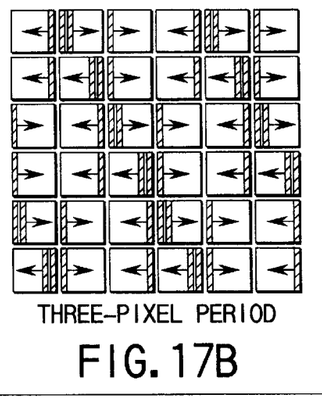
FIG. 17B shows a line pattern which has a three-pixel period and is inclined at 63 degrees.

FIGS. 17A and 17B show a line pattern having an angle of 63 degree. The line pattern of FIG. 17A has a two-pixel period, the line pattern of FIG. 17B has a three-pixel period.

Figure 18A:
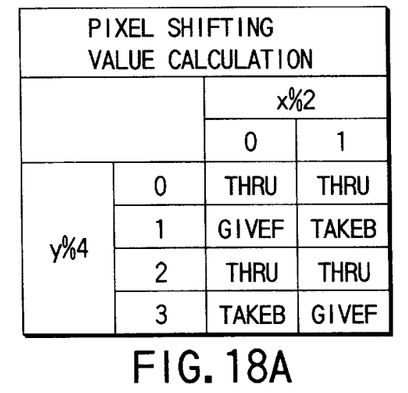
FIG. 18A is a table representing the relationship between the two-dimensional position (x, y) of the processed pixel and types of the pixel shifting value calculation.
Figure 18B:
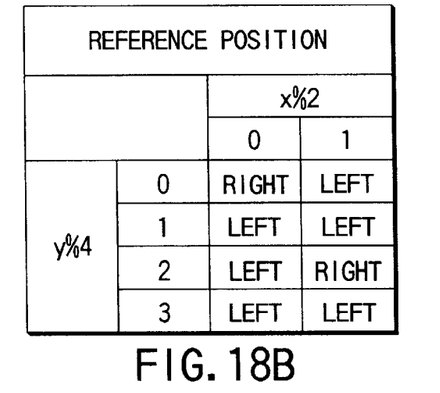
FIG. 18B is a table representing the relationship between the two-dimensional position (x, y) of the processed pixel and a pulse reference position.

FIGS. 18A and 18B show the relationship between the two-dimensional position of the processed pixel and types of the pixel shifting value calculation or the reference position, for forming the line pattern having an angle of 63 degrees and having three-pixel period shown in FIG. 17A.

The line pattern shown in FIG. 17A is subjected to such a pixel shifting value calculation as listed in a table of FIG. 18A. Therefore, in comparing the line pattern shown in FIG. 17A with the conventional line pattern shown in FIG. 21, each line in the line pattern can be formed smoother than that of FIG. 21.

Figure 19A:
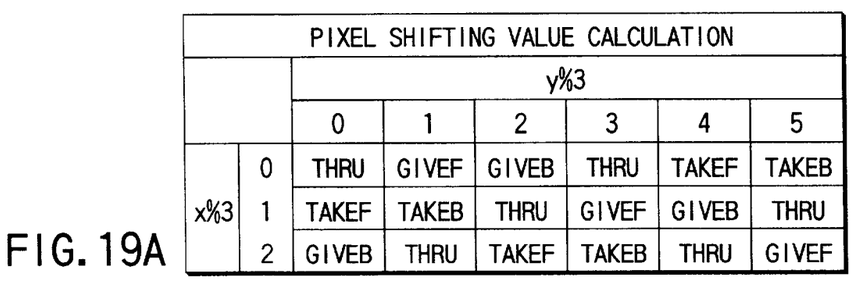
FIG. 19A is a table representing the relationship between the two-dimensional position of the processed pixel and types of the pixel shifting value calculation.
Figure 19B:
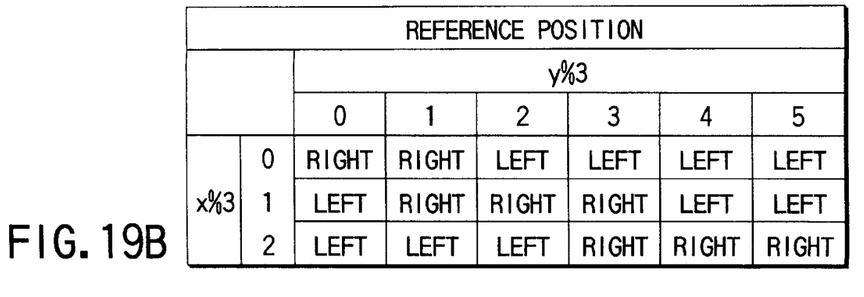
FIG. 19B is a table representing the relationship between the two-dimensional position of the processed pixel and a pulse reference position.

FIGS. 19A and 19B show the relationship between the two-dimensional position of the processed pixel and types of the pixel shifting value calculation or the reference position, for forming the line pattern inclined at 63 degrees and having three-pixel period shown in FIG. 17B.

The main CPU 91 can attain the line pattern merely by writing the reference position of the pixel into the look-up table LUT302 and types of the pixel shifting value calculations to be executed into the look-up table LUT421. To be more specific, the main CPU 91 can easily change the angle and the period of the line pattern merely by changing the contents of these look-up tables. Such easy change of the line angle and line period cannot be attained by the conventional technique. The main CPU 91 can also select a line pattern most suitable for the image by switching the look-up tables in accordance with the characteristics of the histogram of the colors of the image in units of a page, or by switching the look-up tables partially in accordance with the quality of the image.

In addition to the above, various advantages can be attained according to the present invention, as follows:

Generally, gradation stability is regarded to be important for reproducing a photograph, while, for reproducing a character, resolution is regarded to be important. The resolution will be improved if the line period is decreased, though the gradation will be made to be unstable, in contrast. In order to solve this problem, it may be effective to switch the period of the line pattern in units of a page or to locally switch the period of the line pattern for a part of the image in accordance with the result of discrimination between general characters and photograph regions in the image.

Further, in the multicolor recording with use of four print textures of four colors (C: Cyan, M: Magenta, Y: Yellow, and K: Black) each of which has a line pattern, the angles of the line patterns of four colors need to be changed respectively in order to prevent the generation of moire patterns. For the electronic photography, it has been known that the gradation is the most stable in a line pattern having non-inclined vertical lines, i.e., lines parallel to columns of the pixels arranged in the vertical direction (the sub-scanning direction), and that the gradation is made less stable as the angle of the line becomes nearer to 45 degrees. It is thus the most effective method to make the line pattern of black color to have the vertical line structure capable of the most stable recording and to set the period of line pattern of the black print smaller than those of the other color prints, since black color most requires a high level of the resolution and the gradation stability among the four colors.

As described above, according to the above-mentioned embodiment of the present invention, the line pattern the period and angle of which can be set free, can be attained with use of a simple circuit.

In addition, the period and angle of the line pattern can be easily changed merely by changing the contents of the look-up table LUT.

The present invention can further easily change the line pattern in units of a page or in a part of the image in order to select the line pattern suitable for the quality/characteristics of the image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An image processing device comprising:

pixel position calculating means for calculating two-dimensional position of an input process pixel to be processed in an image;

reference position signal generating means for generating a pulse reference position signal of the process pixel on the basis of the two-dimensional position of the process pixel calculated by the pixel position calculating means;

pixel value shifting means for shifting a value of the pixel to be processed to a surrounding pixel next to the process pixel on the basis of the two-dimensional position of the process pixel calculated by the pixel position calculating means and a value of the surrounding pixel, in order to output an output value of the process pixel as a pixel value after the shifting operation; and recording device driving pulse generating means for outputting a recording device driving pulse on the basis of the output value of the process pixel, which is output from the pixel value shifting means, and the pulse reference position signal output from the reference position signal generating means.

2. An image processing device according to claim 1, further comprising pulse width changing means for calculating pulse width data on the basis of input data to output the pulse width data, wherein the pixel value shifting means shift a value of the process pixel to a surrounding pixel next to the process pixel on the basis of the two-dimensional position of the process pixel calculated by the pixel position calculating means and a value of the surrounding pixel, in order to output an output value of the process pixel as a pixel value after the shifting operation.

3. An image processing device comprising:

pixel position calculating means for calculating two-dimensional position of an input process pixel be processed in an image;

reference position signal generating means for generating a pulse reference position signal of the process pixel on the basis of the two-dimensional position of the process pixel calculated by the pixel position calculating means;

pixel value shifting means for shifting a value of the pixel to be processed to a surrounding pixel next to the process pixel on the basis of the two-dimensional position of the process pixel calculated by the pixel position calculating means and a value of the surrounding pixel next to the process pixel, in order to output an output value of the process pixel as a pixel value after the shifting operation;

recording device driving pulse generating means for outputting a recording device driving pulse on the basis of the outputting value of the pixel to be processed, which is output from the pixel value shifting means, on the basis of and the pulse reference position signal output from the reference position signal generating means; and image recording means for recording the image in accordance with the recording device driving pulse output from the recording device driving pulse generating means.

4. An image processing device according to claim 3, wherein the image recording means record a line pattern comprising a plurality of lines each of which is a collection of recording device driving pulse signals of the pixels, the recording device driving pulse signals representing the pixel value, the line pattern has specific period and line angle which are based on the recording device driving pulse output from the recording device driving pulse generating means, the specific line angle is made by the lines and columns of the pixels of the image.

5. An image processing device according to claim 4, wherein the specific period and line angle are set such that the period is decreased as the line angle is decreased.

6. An image processing device according to claim 5, wherein the image recording means set one of four color textures, which has the smallest angle and the shortest period among the four color textures, as a black color texture.

7. An image processing device according to claim 3, wherein the image recording means record a line pattern a frequency and a line angle of which are changed in accordance with color, structure, and density of an entire image on the basis of the recording device driving pulse output from the recording device driving pulse generating means.

8. An image processing device according to claim 7, wherein the structure of the entire image is one of a linear image such as a character and a photograph.

9. An image processing device according to claim 3, wherein the image recording means records a line pattern image comprising a plurality of lines each of which is a collection of recording device driving pulse signals of the pixels, the recording device driving pulse signals representing the pixel value, a frequency and a line angle of the line pattern image are changed locally at a part of the image in accordance with color, structure, and density of an entire image on the basis of the recording device driving pulse output from the recording device driving pulse generating means.

* * * * *